United States Patent [19]

Suzuki et al.

[11] Patent Number: 5,119,445
[45] Date of Patent: Jun. 2, 1992

[54] FEATURE EXTRACTING METHOD

[75] Inventors: Toshihiro Suzuki, Yokohama; Shunji Mori, Hachioji, both of Japan

[73] Assignee: Ricoh Company, Ltd., Japan

[21] Appl. No.: 442,502

[22] Filed: Nov. 28, 1989

[30] Foreign Application Priority Data

Nov. 30, 1988 [JP] Japan .................................. 63-303803
Oct. 9, 1989 [JP] Japan .................................. 1-263757

[51] Int. Cl.⁵ .............................................. G06K 9/44
[52] U.S. Cl. ........................................ 382/55; 382/21; 382/27
[58] Field of Search ........................ 382/22, 27, 60, 55, 382/21

[56] References Cited

U.S. PATENT DOCUMENTS

| | | | |
|---|---|---|---|
| 3,609,685 | 9/1971 | Deutsch | 382/55 |
| 4,379,283 | 4/1983 | Ito et al. | 382/27 |
| 4,525,860 | 6/1985 | Boivie | 382/30 |
| 4,628,532 | 12/1986 | Stone et al. | 382/21 |
| 4,630,307 | 12/1986 | Cok | 382/27 |

OTHER PUBLICATIONS

Nakajima et al., "A Survey of Map and Drawing Input Technology", (1988), pp. 1-8.
Sakai, "Detailed Fundamental Studies on Information", (1983), pp. 74-81 and 150-151.
Kahan et al., "On the Recognition of Printed Characters of Any Font and Size", (1987), pp. 274-288.
Kunieda et al., "Recognition and Vector-Level Description of a Model Base by Regional Division of Multi-Level Images of Hand-Written and Machine Written Drawings", (Apr. 1989), pp. 1-56.
Smith, "Computer Processing of Line Images: A Survey", (1987), pp. 7-15.
Pavlidis, "A Vectorizer and Feature Extractor for Document Recognition", (1986), pp. 111-127.

Primary Examiner—Leo H. Boudreau
Assistant Examiner—David Fox
Attorney, Agent, or Firm—Mason, Fenwick & Lawrence

[57] ABSTRACT

A feature extracting method converts an image data of an input line drawing into a graph representation and recognizes the input line drawing by use of the graph representation. The feature extracting method comprises a first step of equally dividing the image data of the input line drawing into meshes, a second step of obtaining a cell by integrating one or more meshes, and a third step of recognizing a cell pattern for each of cells which are obtained so as to form a graph in correspondence with each of the cells.

5 Claims, 17 Drawing Sheets

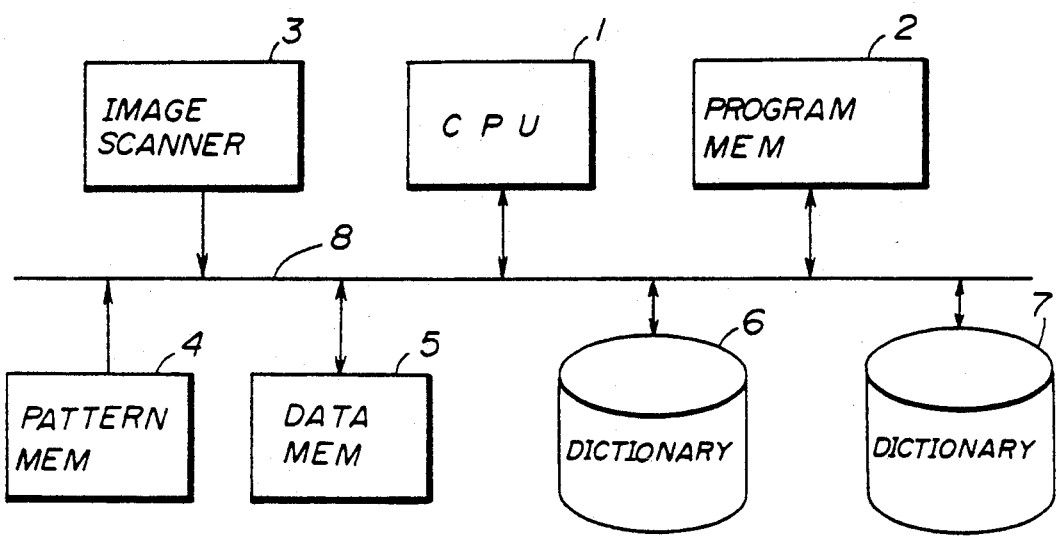

FIG.5A
dang(i) > 0
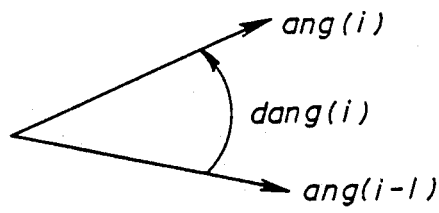
FIG.5B
dang(i) < 0
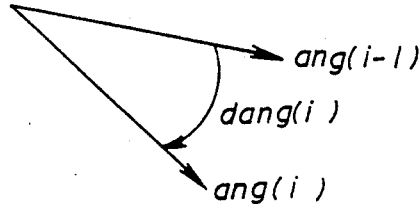
FIG.6A
dang(i) = 0 &
dang(i+1) = 0
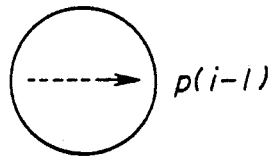
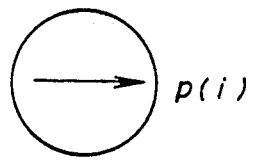
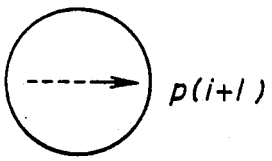
ang(i-1)
→ ang(i)
ang(i+1)
FIG.6B
dang(i) < 0 &
dang(i+1) < 0
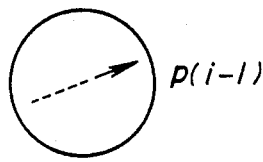
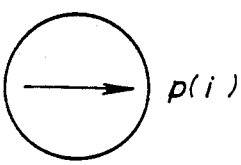
ang(i-1)
ang(i)
ang(i+1)
FIG.6C
dang(i) > 0 &
dang(i+1) > 0
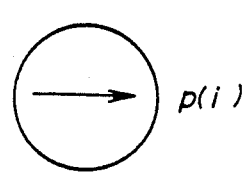
ang(i+1)
ang(i)
ang(i-1)

FIG.7A
dang(i) > 0 &
dang(i+1) 0
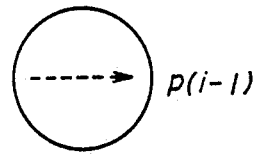
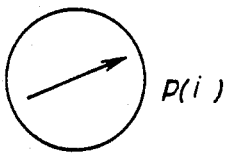
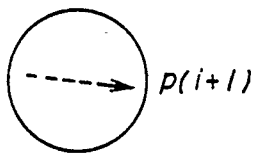
FIG.7B
dang(i) < 0 &
dang(i+1) 0
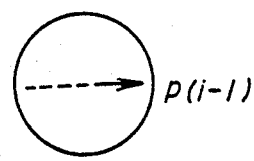
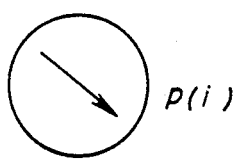
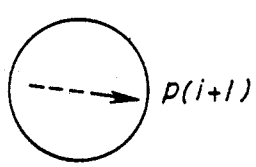
FIG.8
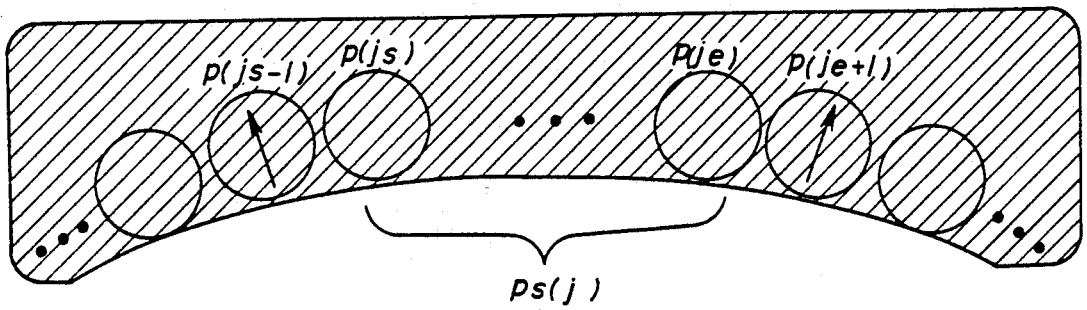

FIG.12A  FIG.12B  FIG.12C
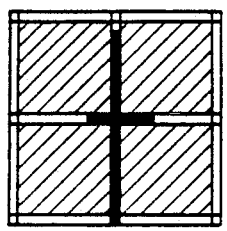 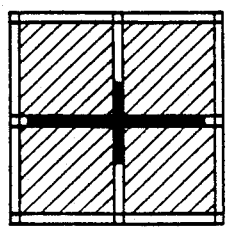 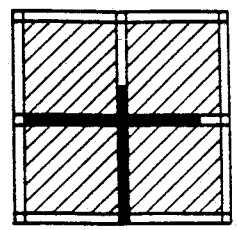
FIG.12D  FIG.12E
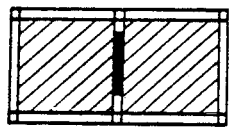 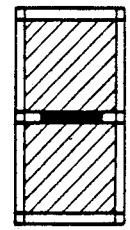
FIG.12F  FIG.12G  FIG.12H
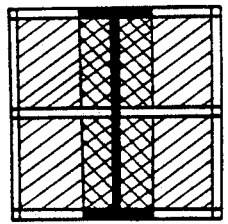 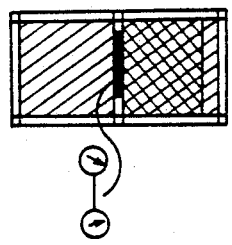 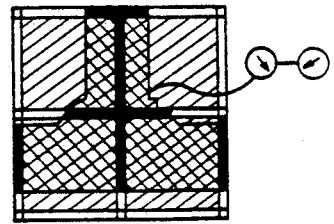

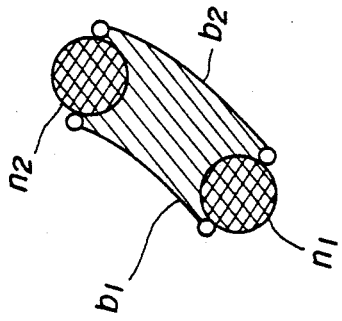
FIG.15A (NO. OF NODES)=0
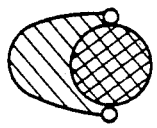
FIG.15B (NO. OF NODES)=1
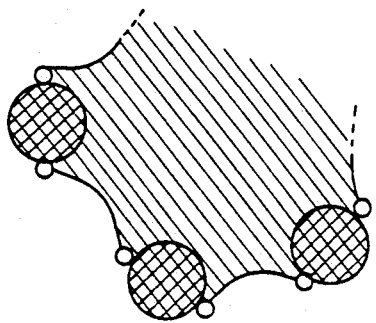
FIG.15C (NO. OF NODES)=2
FIG.15D (NO. OF NODES)=3
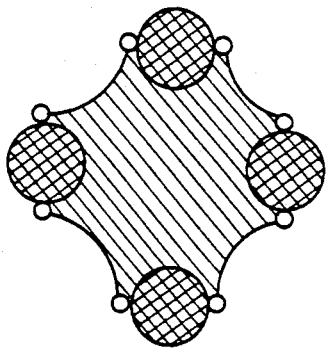
FIG.15E (NO. OF NODES)=4
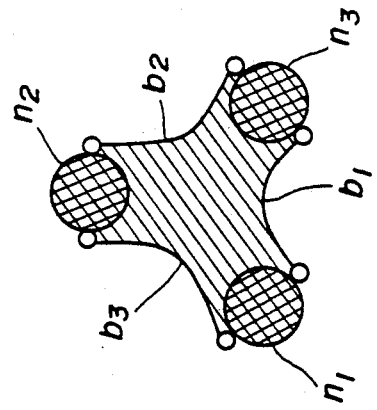
FIG.15F (NO. OF NODES)≧5

FIG.19A
FIG.19B
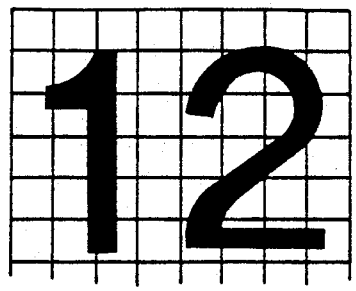
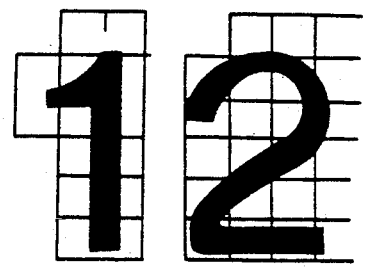
FIG.19C
FIG.19D
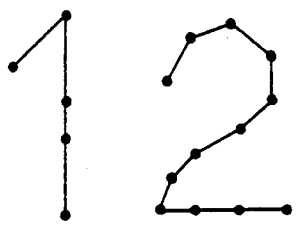
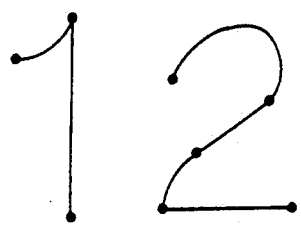
FIG.19E
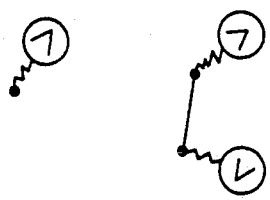

FEATURE EXTRACTING METHOD

BACKGROUND OF THE INVENTION

The present invention generally relates to feature extracting methods, and more particularly to a feature extracting method for extracting features from a line drawing in character recognition apparatuses, drawing recognition apparatuses and the like.

In order to efficiently process image data in apparatuses such as character recognition apparatuses and drawing recognition apparatuses, it is generally necessary to describe in an abstract form an original image data which is represented as a two-dimensional arrangement for the purpose of describing characteristics of the original image. A graph representation is a most popular method of describing a line drawing. The conventional methods of making the graph representation can be roughly divided into a thinning method and a vectorizing method. These methods may be found in Nakajima et al., "A Survey of Map and Drawing Data Input Technology", Shingakugiho, IE88-5, 1988.

According to the thinning method, a thinning process is carried out with respect to the entire image data by eroding black region from its boundary and strokes are detected by tracing black picture elements of the thinned image. The graph representation is obtained based on the detected strokes. This method has an advantage in that the graph representation can always be obtained regardless of the line width and resolution of the line drawing. But on the other hand, this method suffers from problems in that a large information quantity must be processed and much of the information is lost during the thinning process. As a result, unwanted distortions and creases are generated.

According to the vectorizing method, borders of lines are traced and a vector description is made of the borders. The graph representation is obtained by forming a vector in a portion between a confronting vector pair. This method has an advantage in that the information quantity which must be processed is relatively small. But on the other hand, this method suffers from problems in that it is difficult to automatically set parameters which determine the vector pair depending on the line width and the resolution, and that a desired skeleton cannot be obtained when short strokes are tightly placed such as the case of a character, a graphic symbol and the like.

Furthermore, according to the thinning method and the vectorizing method, there is a common problem in that it is difficult to absorb a deviation in the pattern such as smear and faint stroke.

The problems described above are mainly due to the fact that each of the conventional methods only use a bottom-up processing which uses the picture element or its limited adjacency as the observation unit.

SUMMARY OF THE INVENTION

Accordingly, it is a general object of the present invention to provide a novel and useful feature extracting method in which the problems described above are eliminated.

Another and more specific object of the present invention is to provide a feature extracting method for converting an image data of an input line drawing into a graph representation and for recognizing the input line drawing by use of the graph representation, the feature extracting method comprising a first step of equally dividing the image data of the input line drawing into meshes, where each mesh is an observation unit, a second step of obtaining a cell by integrating one or more meshes, where each cell is an observation unit and has only one black picture region connecting component, and a third step of recognizing a cell pattern for each of cells which are obtained so as to form a graph in correspondence with each of the cells. According to the feature extracting method of the present invention, it is possible to extract the features from an arbitrary line drawing at a high speed with flexibility by use of a sufficient information quantity. The recognition rate is improved by absorbing local deviations in the patterns.

Other objects and further features of the present invention will be apparent from the following detailed description when read in conjunction with the accompanying drawings.

BRIEF DESCRIPTION OF THE DRAWINGS

FIG. 1 is a system block diagram showing a system for carrying out a first embodiment of a feature extracting method according to the present invention;

FIGS. 2A and 2B are diagrams for explaining a correspondence of an original image and a graph representation;

FIGS. 5A, 5B, 6A through 6C, 7A, 7B and 8 are diagrams for explaining a smoothing process for smoothing an inclination direction of boundary points;

FIGS. 12A through 12H are diagrams for explaining types of mesh integration requests;

FIGS. 15A through 15F are diagrams for explaining relationships of nodes and boundary point strings;

FIGS. 19A through 19E are diagrams for explaining examples of the hierarchical graph structure;

DESCRIPTION OF THE PREFERRED EMBODIMENTS

Figure 3:
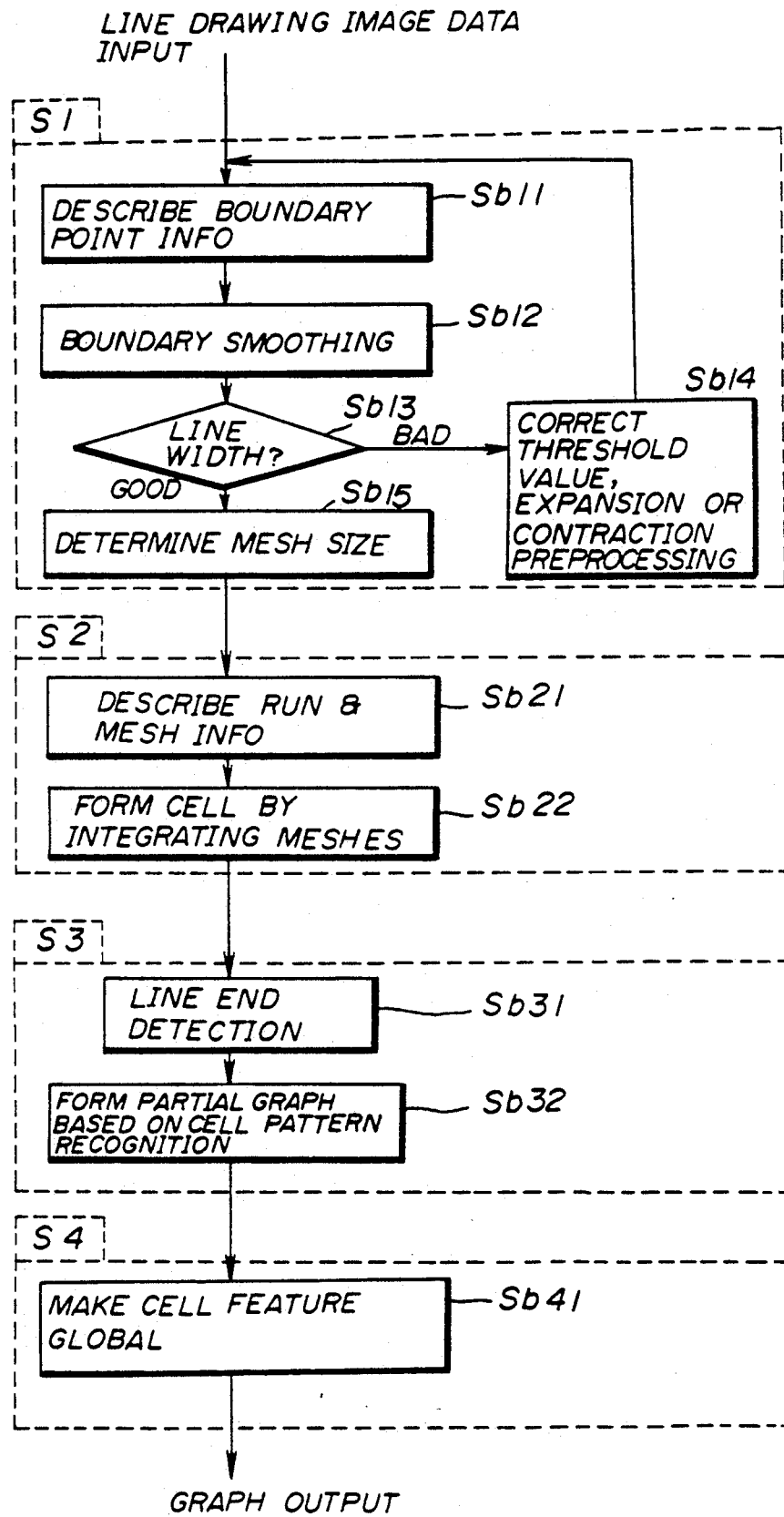
FIG. 3 is a flow chart for explaining an embodiment of the entire line drawing description process.

In the present invention, a "mesh" and a "cell" are introduced as observation units. First, an image is equally divided into small meshes, and a cell is obtained by integrating the small meshes. Then, a top-down approach is employed to recognize a cell pattern for each cell so as to form a corresponding partial graph. Furthermore, cell features are made more globaly to correct the graph. Depending on the kind of image, the partial graph is formed in units of the meshes.

In the field of patter information processing, there is an extremely important concept called "equivalent information source". For example, the equivalent information source is discussed in Sakai, "Detailed Fundamental Studies on Information", Corona Co. (publisher), 1983. Simply stated, this is a concept that the method of observing an information source is not unique and that the information source alphabet differs depending on the setting of the observation unit. When processing the pattern information, there is a need to set the observation unit depending on the object of the processing regardless of whether the pattern information is a line drawing, a multi-level image, a color image or an audio data.

Of course, it is desirable that the number of kinds of information source symbols which are observed is small and that combinations are easily obtainable. Generally, as the observation unit becomes large, it becomes possible to make an observation which is not local, but the number of kinds of information source symbols increases and the combinations become complex.

Next, the approach of obtaining the graph representation from the line drawing will be considered from the point of view of the equivalent information source. As described above, the thinning and vectorizing methods use the picture element or its limited adjacency as the observation unit, and these methods suffer from the problems mainly due to the local observation.

A method which uses a run (connecting component of black picture elements) as the observation unit is discussed in Kahan et al., "On the Recognition of Printed Characters of Any Font and Size", IEEE Trans. on PAMI, Vol. PAMI-9, No. 2, 1987. But the object of the discussed processing is to extract one feature quantity for the character recognition, and the method is insufficient from the point of view of detailed graph representation.

Although it is desirable from the point of view of the processing accuracy to use the plane as the observation unit, the difficulty in doing so was mainly due to the fact that no restricting condition could be found to limit the number of kinds of information source symbols to a small number.

According to the present invention, the cell is obtained by adaptively integrating the meshes which basically have a fixed size (slightly larger than the line width), so as to eliminate the above described problems. The cell only has one black picture region connecting component, and a preferable restricting condition is satisfied since a link (black picture region connecting component at the cell boundary) is commonly owned by two cells. Hence, the number of kinds of information source symbols becomes small and only includes the connection, branch, intersection and the like. That is, the problem of obtaining the graph of the line drawing by forming a node at a middle point of the link may be replaced by and considered as a relatively simple problem of recognizing the cell pattern and correctly connecting the nodes. For example, when there are two nodes, the problem is to recognize whether the nodes are to be directly connected or to add a node so that there is a bend at the added node. Similarly, when there are three nodes, the problem is to recognize whether the shape is a Y-shape, a V-shape or a T-shape.

By using as the observation unit the cell which is obtained by integrating non-local meshes, it is possible to realize with compatibility both the non-local observation and small number of kinds of information source symbols. In addition, when the features related to the cell are made more globaly into some kind of form, it is possible to improve the robustness against noise.

From the point of view of the information quantity which is to be processed, the majority of the cells require only a simple processing when complex graphics such as Kanji characters are excluded. In other words, the majority of the cells have two nodes and are described by a simple connection, and the cells having three or four nodes to describe a branch or an intersection do not appear frequently. Therefore, the information quantity which is to be processed as a whole is relatively small.

Next, a description will be given of a first embodiment of the feature extracting method according to the present invention, by referring to FIG. 1. FIG. 1 shows a system for carrying out the first embodiment of the feature extracting method. In FIG. 1, the system comprises a central processing unit (CPU) 1, a program memory 2, an image scanner 3, a pattern memory 4, a data memory 5, a dictionary 6 of cell forming rules, and a dictionary 7 of graph forming rules which are coupled via a bus 8.

The CPU 1 carries out processes such as a feature extraction process and a recognition process. The program memory 2 stores programs which are required to carry out the processes on the CPU 1. The image scanner 3 scans a document and inputs a line drawing such as a character as an input bilevel image data. The pattern memory 4 stores the input bilevel image data. The data memory 5 stores intermediate data, resultant data and the like which are produced during the process which is carried out on the CPU 1. The dictionary 6 stores rules for forming a cell by integrating meshes. The dictionary 7 stores rules for forming a partial graph with respect to the cell.

The CPU 1 carries out a process to obtain from an original image data such as "abc" shown in FIG. 2A a graph representation shown in FIG. 2B. Further, if needed, the obtained graph is corrected so as to form a high order graph which has a high degree of abstract.

FIG. 3 is a flow chart for explaining an embodiment of the entire line drawing description process of the CPU 1. The line drawing description process generally comprises four basic steps S1 through S4.

In the basic step S1, a step sb11 describes the boundary point information and a step sb12 smoothens the inclination direction of the boundary points. A step sb13 discriminates whether the line width is good or bad, that is, whether or not the line width is acceptable. When the line width is bad, a step sb14 carries out a process such as correcting a binarization threshold value and making an expanding/contracting process, and the process returns to the step sb11. On the other hand, when the line width is good, a step sb15 determines the mesh size.

In the basic step S2, a step sb21 describes the run and mesh information, and a step sb22 forms a cell by integrating the meshes. The formed cell is used as an observation unit in the basic step S3.

In the basic step S3, a step sb31 makes a line end detection process to make a cell pattern recognition for each cell, and a step sb32 forms a partial graph based on the cell pattern recognition.

In the basic step S4, a step sb41 makes the cell features global, that is, corrects the graph and forms a high order graph.

The basic step S1 can be regarded as a pre-process with respect to the basic step S2. In addition, the basic steps S1 and S2 together may be regarded as a pre-process with respect to the basic steps S3 and S4, and in this case, the basic steps S3 and S4 are in charge of the feature extraction and discrimination. Furthermore, the basic steps S1 through S4 together may be regarded as a series of processes from the pre-process to a portion of the feature extraction. In this case, an external recognition means extracts from the graph the detailed features which are necessary for the recognition.

Next, a detailed description will be given of the basic steps S1 through S4. In the description hereunder, various terms which are used have the following definition. Sampling scanning lines are defined as horizontal or vertical lines, both of which comprise the grid network whose unit grid is a mesh. A "run" is a connecting component of black picture region on a sampling scanning line. "Meshes" are small rectangular regions of identical size which are surrounded by the sampling scanning lines. A "cell" is a region which is obtained by integrating one or more meshes, and the cell has only one black connecting component therein and no black picture element at a corner point of region boundary picture elements. A "link" is a run which is observed on boundary picture elements of meshes or cells, and the link is commonly owned by two cells.

The basic step S1 is a pre-process for forming the cell, and this pre-process is carried out with respect to the line drawing image which is input from the image scanner 3.

Figure 4A:
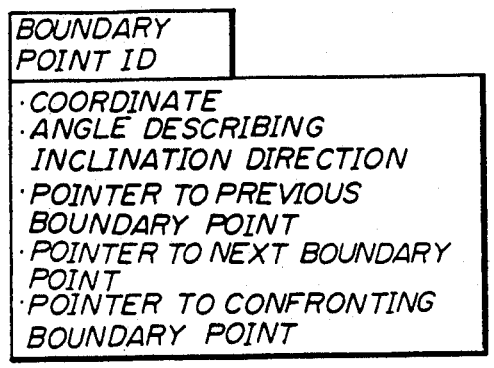
FIGS. 4A through 4F are diagrams for explaining embodiments of data structures obtained in the process shown in FIG. 3.
Figure 4B:
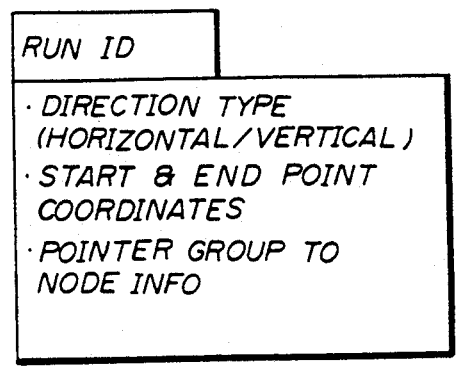
Figure 4C:
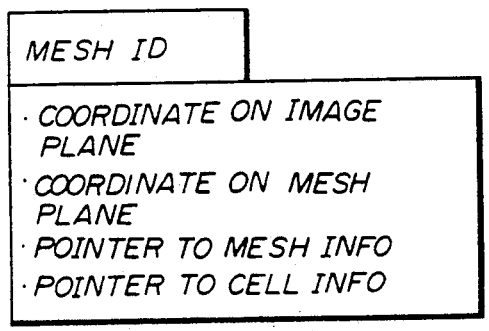
Figure 4D:
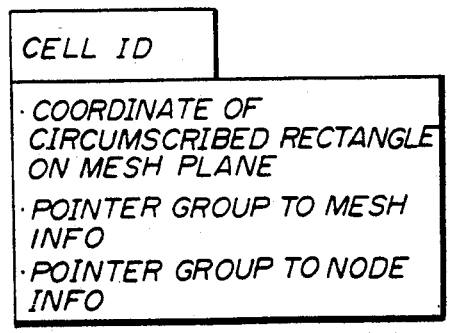
Figure 4E:
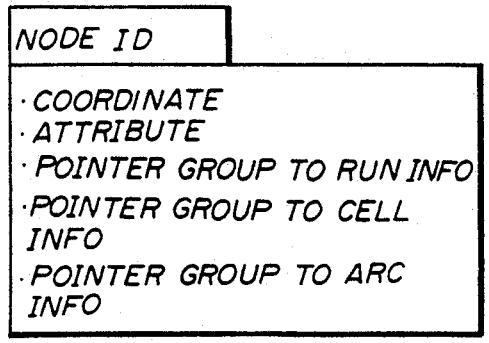
Figure 4F:
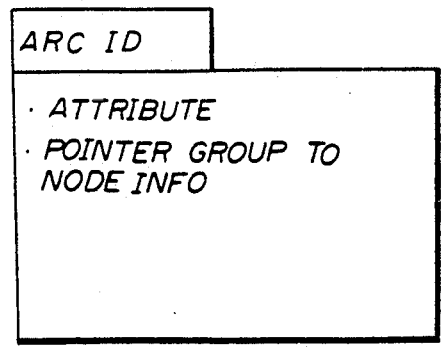

The step sb11 obtains the black picture region boundary points and describes the black picture region boundary points in a format shown in FIG. 4A. Then, the step sb12 smoothens the inclination direction of the black picture element boundary points. The smoothing is only carried out with respect to the inclination direction on the two-dimensional image plane, and no smoothing is carried out with respect to the tone axis which is generally referred to as the magnitude of the inclination.

FIGS. 4A, 4B, 4C, 4D, 4E and 4F respectively show data structures of a boundary point information, a run information, a mesh information, a cell information, a node information and an arc information.

No proposals have been made to the present with regard to a method of smoothing the inclination direction. It is possible to use the known smoothing method which is carried out with respect to the entire image data, but the effects of this smoothing method are small when applied to the smoothing of the inclination direction even though a relatively large information quantity is processed.

Hence, this embodiment employs a new smoothing method which is simple but the effects thereof when applied to the smoothing of the inclination direction are large. According to this new smoothing method, an arbitrary boundary point is taken as a tracing start point and the smoothing is carried out while tracing the boundary points. It is assumed that a boundary point string (string of boundary points which are black picture elements) has a cyclic structure such that the tracing start point and a tracing end point are adjacent to each other, and for the sake of simplifying the description, the boundary point string is described in one dimension to avoid a description using a remainder. A similar description is used for the inclination detection.

FIGS. 5A and 5B are diagrams for explaining a difference of angles describing the inclination angle. It is defined that p(i) denotes an with boundary point from the start point, ang(i) denotes an angle which describes the inclination direction of the boundary point p(i) on the two-dimensional plane, and dang(i) denotes a difference between the angles ang(i) and ang(i−1) with reference to the angle ang(i).

There are two solutions to the difference of angles, but a relation $-\pi < \text{dang}(i) < \pi$ stands for all values of i when the resolution of the image scanner 3 is sufficiently high. Hence, one of the differences having the smaller absolute value is regarded as the actual difference.

Next, a relationship of the points p(i), p(i−1) and p(i+1) and the continuity of the inclination direction will be considered. When the three points p(i), p(i−1) and p(i+1) are located on a boundary of an ideal straight line or curve, the following inclination continuity condition holds.

$$(\text{dang}(i) \leq 0 \omega \text{dang}(i+1) \leq 0) \cup (\text{dang}(i) \geq 0 \omega \text{dang}(i+1) \geq 0 \omega)$$

FIGS. 6A, 6B and 6C show examples of inclination continuous points. On the other hand, when the above inclination continuous condition does not hold, it is necessary to smoothen the angle ang(i) and the point p(i) is regarded as an inclination discontinuous point. FIGS. 7A and 7B show examples of the inclination discontinuous points.

An inclination discontinuous point string PS(j) refers to a jth inclination discontinuous point out of the string of inclination discontinuous points of the boundary points p(i) as shown in FIG. 8, where a hatched portion in FIG. 8 indicates a black region. The inclination discontinuous point string PS(j) can be described by the following formula, where k=js,..., je are inclination discontinuous points.

$$PS(j) = [p(js), p(js+1), \ldots, p(je)] | p(k)$$

When the inclination discontinuous point string PS(j) is detected, this PS(j) is corrected into an inclination continuous point string in accordance with a concavoconvex portion in a vicinity of PS(j).

In a first case where the signs of dang(js−1) and dang(je+2) are the same, it is sufficient to represent one concave or convex by PS(j). A range R(j) of the inclination direction of the boundary points included in PS(j) is between ang(js−1) and ang(je+1). However, there are two such ranges, and the range which maintains the concavoconvex portion in the vicinity of PS(j) is taken as the range R(j). The smoothing is carried out by correcting the inclination direction ang(k) (k=js,..., je) so as to equally divide the range R(j) by a number which is one greater than the number of points included in PS(j). If the size of R(j) is sufficiently small, it is possible to consider PS(j) as a straight line and regard all ang(k) (k=js,..., je) as a direction which equally divides R(j) into two.

In a second case where the signs of dang(js−1) and dang(je+2) are different, PS(j) must represent at least one concave and one convex. A complete smoothing is difficult to carry out, but this second case rarely occurs.

In this case, the following simple smoothing process is carried out for each inclination discontinuous point. In other words, ang(i) is made equal to ang(i−1)+(dang(i)+dang(i+1))/2 with respect to p(i) which is an inclination discontinuous point. This formula means dividing the angle between ang(i−1) and ang(i+1) into two. The timing with which ang(i) is corrected to the new value may be in series (in which case the correction is affected because the correction precedes the processing of p(i+1)) or in parallel.

By the process described above, it is possible to smoothen the inclination direction of the boundary points. In order to reduce the information quantity which is processed, only the simple smoothing process may be carried out without obtaining the inclination discontinuous boundary points, and the effects of the smoothing may be improved by repeating the simple smoothing process.

Since the above described smoothing process is carried out with respect to only the boundary points and not all the picture elements, the information quantity which is processed is relatively small. Furthermore, the effects of the smoothing is large because the smoothing is carried out so that an inclination discontinuous point string becomes an inclination continuous point string.

Figure 9A:
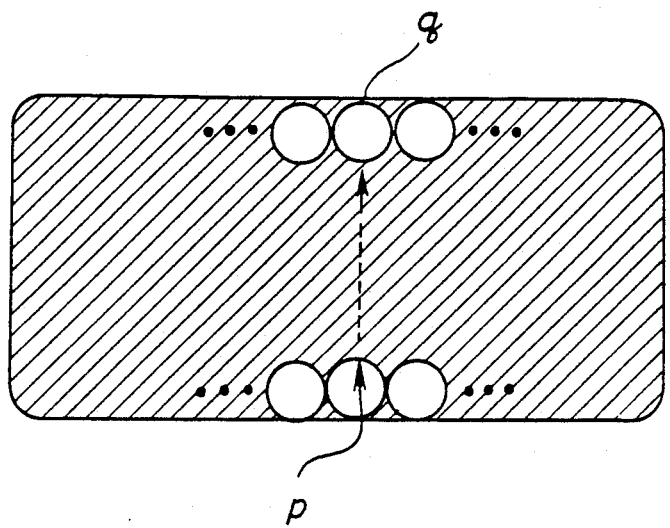
FIGS. 9A and 9B are diagrams for explaining confronting boundary points.
Figure 9B:
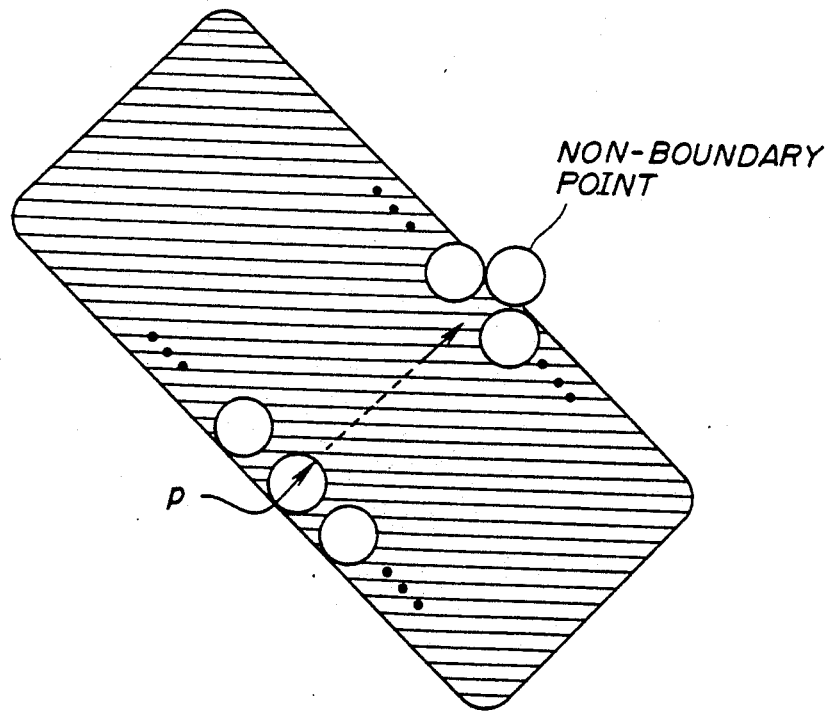

Next, the steps sb13 through sb15 determine the mesh size based on the estimated line width. The line width is estimated by use of the smoothened inclination direction. First, the confronting boundary point is found in the following manner. That is, as shown in FIG. 9A, the black picture elements are traced from an object boundary point p in an inclination direction ang of point p, and a first boundary point q which is found is taken as the confronting point with respect to p. As shown in FIG. 9B, when the boundary point tracing is made in an 8-nearest neighbor connection, it is possible that a white picture element is found before the boundary point, but in this case, an appropriate one of the boundary points adjacent to this white picture element is selected.

Then, distances between all of the boundary points and the confronting boundary point are obtained and a histogram is made from the obtained distances. An estimated line width w is obtained at a point where the histogram has a maximum value. When the estimated line width w is too large or too small, the step sb14 takes an appropriate measure by correcting the binarization threshold value, making an expanding/reducing process with respect to the entire image or the like.

The step sb15 determines a mesh size T. The mesh size T is made slightly larger than the estimated line width w, and as a standard, the mesh size T is made approximately 1.5 times the estimated line width w. Accordingly, it is extremely rare that the mesh falls completely inside a line segment.

Compared to the conventional method which uses the run length statistics, the above described process can correctly estimate the line width even when a large number of oblique lines exist in the image, although the information quantity which is processed slightly increases. For this reason, the above described process can appropriately set the mesh size.

The basic step S2 is a process of integrating the meshes and forming the cell. First, the step sb21 describes the run and the mesh in the formats respectively shown in FIGS. 4B and 4C. The description of the mesh need only be made when the black picture element exists within the mesh, and otherwise no description is necessary.

Figure 10A:
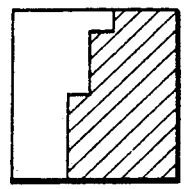
FIGS. 10A through 10D are diagrams for explaining a mesh multiplexing.
Figure 10B:
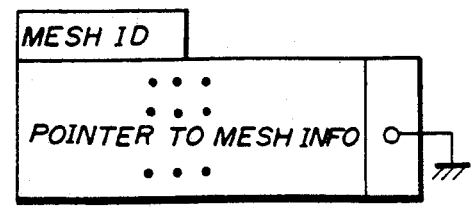
Figure 10C:
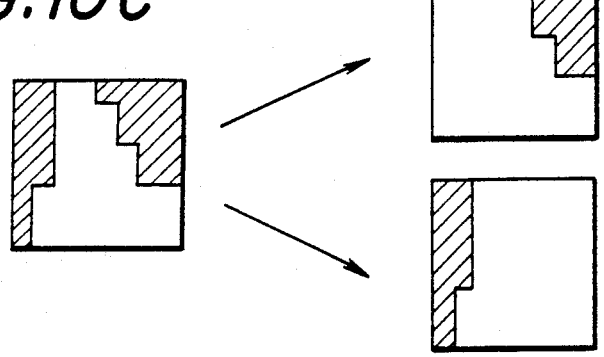
Figure 10D:
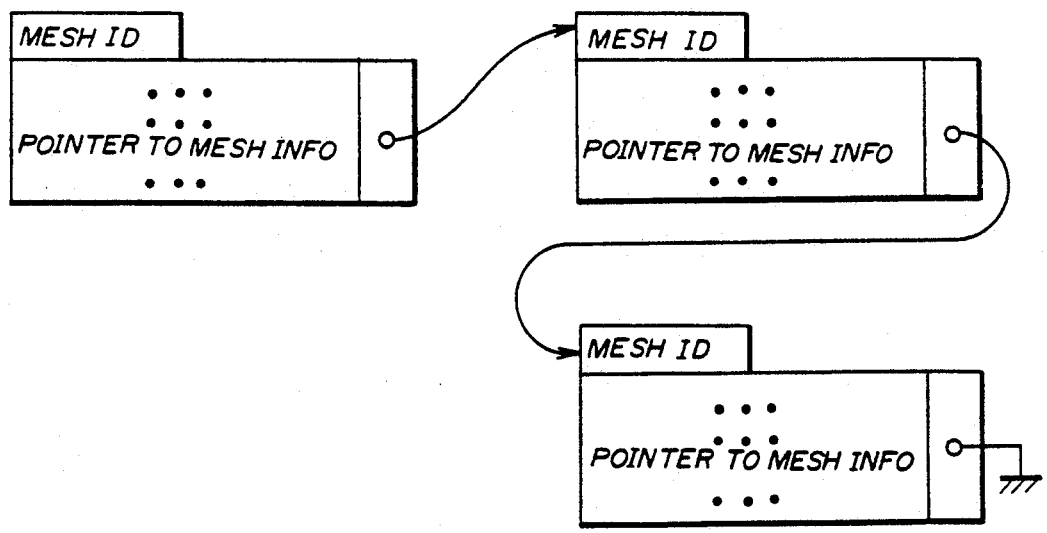

FIGS. 10A through 10D show examples of the description of the mesh. When the number of regions (number of black connecting components) within the mesh is "1" as shown in FIG. 10A, the mesh is described as shown in FIG. 10B. On the other hand, when the number of regions within the mesh is "2" or more as shown in FIG. 10C, the mesh multiplexing is carried out. In this latter case, the data structure representation may be made as shown in FIG. 10D. The multiplexed meshes may be distinguished depending on the run to which the multiplexed mesh is connected. The mesh multiplexing can efficiently describe the meshes with identical formats, and it is easy to mask unnecessary meshes. For this reason, various feature extraction algorithms are applicable to the mesh multiplexing, and there is an advantage in that the features can be extracted correctly.

Figure 11:
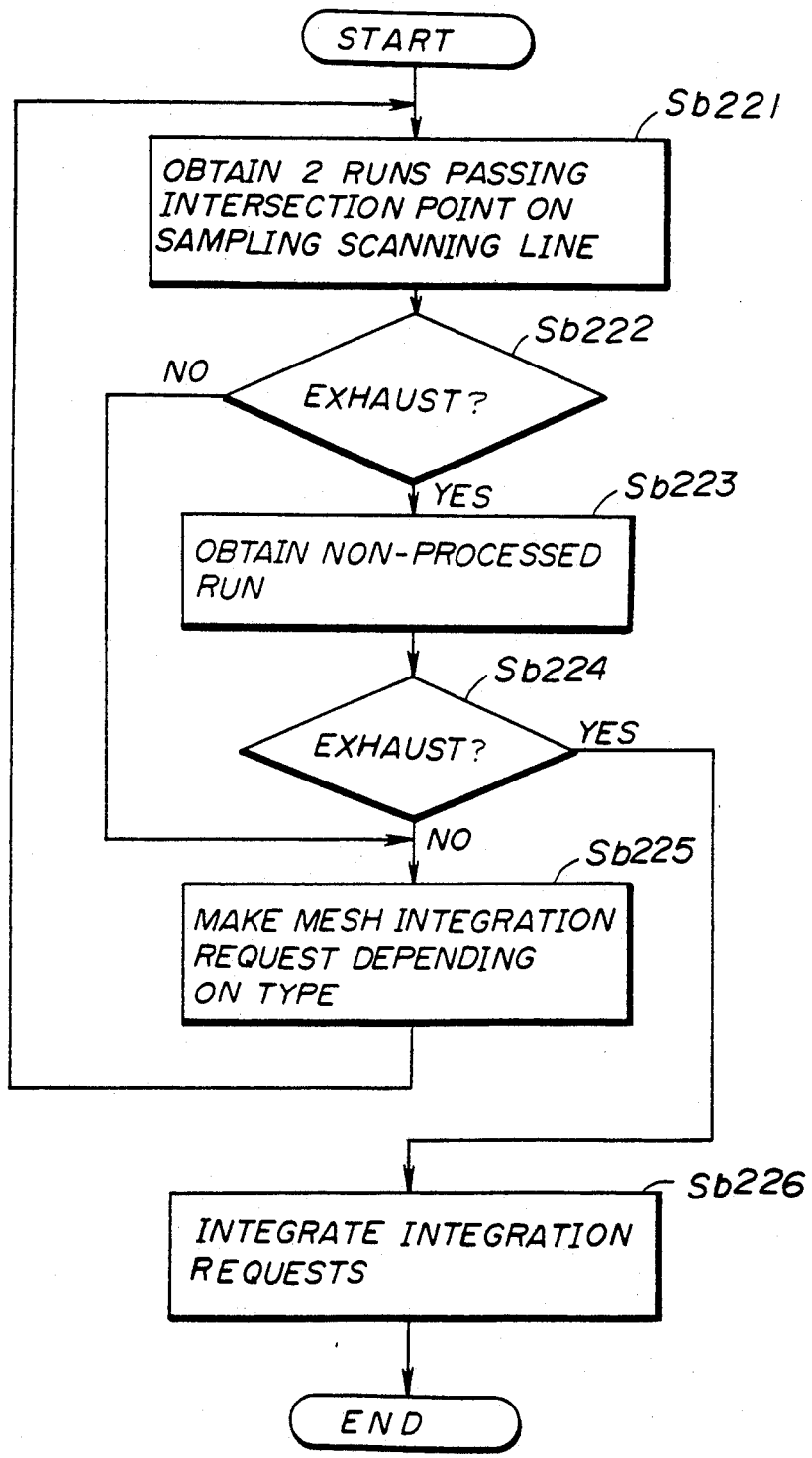
FIG. 11 is a flow chart for explaining a mesh integration process.
Figure 13C:
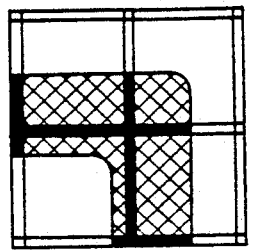
FIGS. 13A through 13D are diagrams for explaining cells.
Figure 13B:
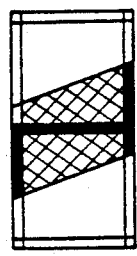
Figure 13D:
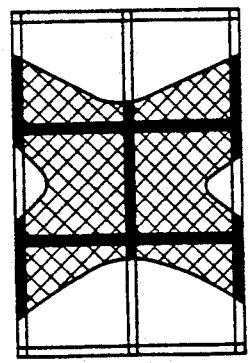
Figure 13A:
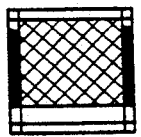

Next, the step sb22 forms the cell by the integrating the meshes. FIG. 11 is a flow chart for explaining the mesh integration process. A step sb221 obtains two runs which pass through the intersection of the sampling scanning lines which are horizontal and vertical. First, a step sb221 selects the intersection on the sampling scanning line which is a part of block picture region, and obtains types of combinations of the two runs in the horizontal and vertical directions which commonly own the selected black picture region. The types of combinations of the runs can be divided into the following three types which are "type a", "type b" and "type c".

"Type a":

$$eval(run\_x) \cap (\sim eval(run\_y) \cup |run\_x| \leq |run\_y|)$$

"Type b":

$$eval(run\_y) \cap (\sim eval(run\_x) \cup |run\_x| \leq |run\_y|)$$

"Type c":
Other than "type a" and "type b".

In the description above, the terms have the following definitions.

|r|: Length of a run r.
a1(r), a2(r): Inclination directions of boundary points at both ends of the run r.
T: Mesh size.
eval(r): An evaluation function of the run which is a logic function such that when the run r is suitable as the cell boundary and satisfies the condition $|r| \leq T \cap ((a1(r)$ and $a2(r)$ confront substantially in parallel$) \cup (a1(r)$ and $a2(r)$ do not face the same side when r is taken as the axis) it is true and otherwise false.
run\_x, run\_y: Runs in the horizontal and vertical directions, respectively.

In the dictionary 6, integration requests shown in FIGS. 12A through 12C are made in correspondence with the three types. The integration request is a request to make an integration process with respect to the meshes having the same hatched pattern in FIGS. 12A through 12C.

When there exists a run which is commonly owned by two meshes but is not yet examined, the discrimination result in a step sb222 is YES and the a step sb223 obtains the run which is not yet processed. Then, a step sb224 discriminates whether or not the run evaluation function is true. When the discrimination result in the step sb224 is NO, the step sb225 examines the type of run which is commonly owned by two meshes but is not yet examined, and makes a request to integrate the two meshes which commonly own the run when the run evaluation function is false. FIGS. 12D and 12E show examples of the integration requests which are made in this case. The process returns to the step sb221 after the step sb225.

With respect to the following undesirable run, the run evaluation function becomes false in virtually all cases, and the undesirable run will not remain as a cell boundary. The undesirable runs are (i) a long run which matches a direction of the line segment as shown in FIG. 12F, (ii) a run which is formed by a zigzag noise at the boundary of the line segment as shown in FIG. 12G, and (iii) a run which traverses the inside of the branch as shown in FIG. 12H.

When the discrimination result in the step sb224 is YES, a step sb226 integrates the integration requests as a whole. Hence, a cell is obtained by making a minimum integration which satisfies all of the integration requests. The obtained cell is described in a format shown in FIG. 4D. With respect to a run (link) which remains as the cell boundary, a node information having the coordinate of the middle point of the run is described in a format shown in FIG. 4E.

FIGS. 13A through 13D show examples of the cell which is obtained by the basic step S2. FIGS. 13A, 13B, 13C and 13D respectively show the cells with one, two, four and six meshes.

Figure 14:
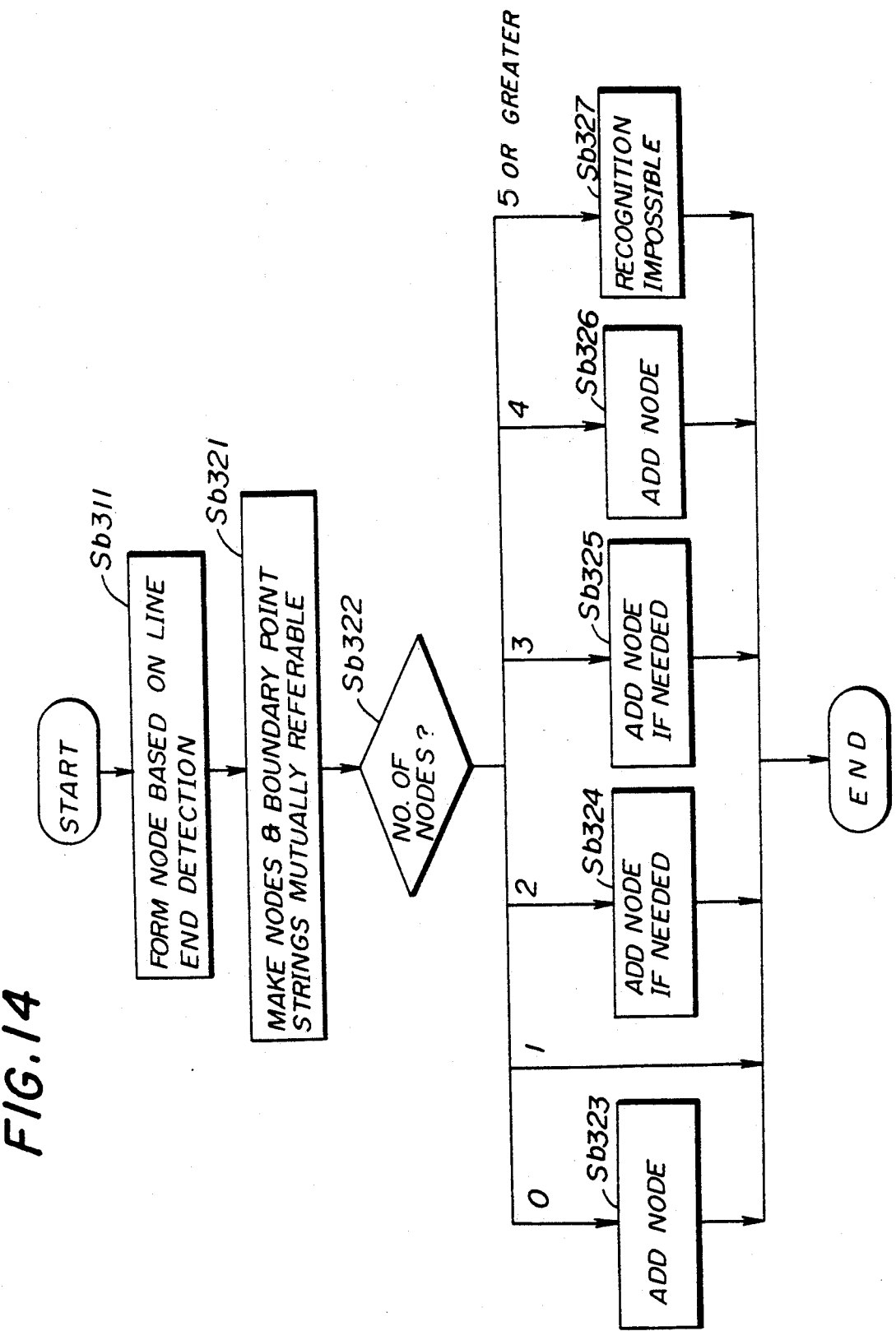
FIG. 14 is a flow chart for explaining a partial graph forming process.

Next, a description will be given of the basic step S3 The basic step S3 obtains the partial graph for each cell based on the cell pattern recognition. The step sb31 carries out the line end detection process. In FIG. 14, a step sb311 corresponds to the step sb31 in FIG. 3 and detects a convex line end with respect to each boundary point string within the cell. When there is a line end, a corresponding node is obtained. A line end candidate boundary point string detection process which is described hereunder is carried out for each case where the tracing direction is taken clockwise or counterclockwise, and this process is ended by taking as the line end the boundary point string which becomes the line end candidate for both tracing directions.

First, a label of each boundary point is cleared and an initial value of a count is set. Then, a labelling is started from a start point of the boundary point string, and a process is carried out to make the label of an object boundary point a value of the count at this point in time. In this state, when the label of the confronting boundary point is equal to the label of the object boundary point, it can be regarded that a fold back occurs beyond the line end. In this case, the confronting boundary point to the object boundary point is regarded as the line end candidate and the value of the count is renewed to prepare for the next candidate.

The line end detection process is carried out based on the structure of the line end, and thus, no threshold value is required. But when reducing the information quantity to the processed, a suitable threshold value may be set and a labelling may be made in only one direction, where the labelling is "detect the line end and renew the value of the count at the point in time when the line end candidate boundary point string is found if the difference between the inclination direction of the object boundary point and the inclination direction of the confronting boundary point is sufficiently close to $\pi$.

In FIG. 14, steps sb321 through sb327 correspond to the step sb32 of the basic step S3 shown in FIG. 3. The steps sb321 through sb327 form the partial graph based on the curvature of the boundary point string.

The step sb321 makes the nodes and the boundary point strings mutually referable. With regard to the relationship between the nodes and the boundary point strings, it is guaranteed that the number of nodes and the number of boundary point strings are equal when the number of nodes is one or greater as shown in FIGS. 15A through 15F. In addition, it is guaranteed that the boundary point string has no convex because the line end is already detected, and the process which is carried out thereafter is extremely general and can be performed in the top-down manner. FIGS. 15A through 15F schematically show the relationships of the nodes and the boundary point strings in the cell, where a large circle indicates a node, a small circle indicates a start or end point of the boundary point string, a line connecting the small circles indicates the boundary point string, and a hatched region indicates the black region.

The process of forming the partial graph differs depending on the number of nodes, as may be seen from FIG. 14. A step sb322 discriminates the number of nodes, and the process proceeds to one of steps sb323 through sb327 or the process is ended depending on the number of nodes.

Before explaining the process of forming the partial graph, a description will be given of the curvature and a furthermost point. The curvature is a feature quantity which represents the curved degree of the boundary point string. The curve of the concave becomes larger as the positive value of the curvature becomes larger, and the curve of the convex becomes larger as the absolute value of the negative value of the curvature becomes larger.

Figure 16:
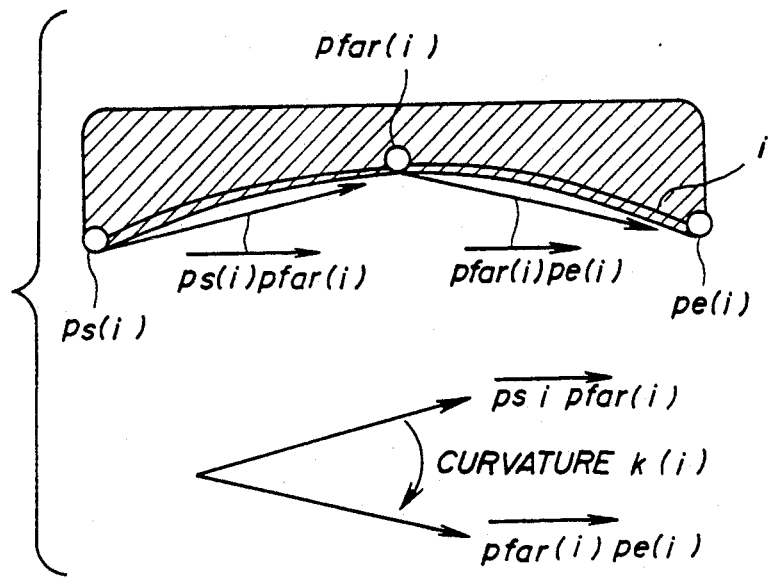
FIG. 16 is a diagram for explaining a method of obtaining a curvature of the boundary point string.

A curvature $k(i)$ with respect to a boundary point string i is obtained as an angle between a vector $\overline{p_s(i)p_{far}(i)}$ and a vector $\overline{p_{far}(i)p_e(i)}$ as shown in FIG. 16, where start and end points of i are respectively denoted by $p_s(i)$ and $p_e(i)$ and a furthermost point from a straight line which passes through $p_s(i)$ and $p_e(i)$ is denoted by $p_{far}(i)$.

As an alternative, it is possible to utilize the fact that the inclination angle of the boundary points is approximately perpendicular to the direction of the boundary point string. In this case, a positive/negative sign which considers the concavo-convex may be added to the range size of the inclination direction of the boundary points included in the boundary point string i and regarded as the curvature. In addition, it is possible to use as the furthermost point a point where the change in the inclination direction is a maximum.

Next, a description will be given of the processes carried out in the steps sb323 through sb327 depending on the number of nodes. The rules under which these processes are carried out are stored in the dictionary 7 in FIG. 1.

In a case where the number of nodes is zero as shown in FIG. 15A, the step sb323 adds one node which has a coordinate of the center of gravity of the black connecting component which belongs to the cell, but forms no arc.

In a case where the number of nodes is one as shown in FIG. 15B, the node which represents the end point already exists, and so no additional process needs to be carried out. In other words, the process is ended.

In a case where the number of nodes is two as shown in FIG. 15C, the step sb324 carries out the following process. That is, the two nodes are denoted by $n_1$ and $n_2$ and the two boundary point strings are denoted by $b_1$ and $b_2$. In order to determine whether or not a connecting point is required at the intermediate portion, the curvature with respect to $b_1$ and $b_2$ is obtained. When the absolute value of the obtained curvature is sufficiently large, the relationship $\max(|\text{curvature}(b_1)|,|\text{curvature}(b_2)|) > T_1$ holds with respect to the threshold value $T_1$. When this relationship holds, it is regarded that the connecting point is required at the intermediate portion, and a connecting point node is added. This connecting point node has a coordinate of the middle point of the line segment which connects the two furthermost points $p_{far}(b_1)$ and $p_{far}(b_2)$. Then, two arcs which represent the connection of the connecting point node and the nodes $n_1$ and $n_2$ respectively are formed. The arcs have data structure shown in FIG. 4F. On the other hand, when the above described relationship does not stand, it is regarded that no connecting point is required and an arc which represents the connection of the nodes $n_1$ and $n_2$ is formed.

In a case where the number of nodes is three as shown in FIG. 15D, the step sb325 carries out the following process. That is, the three nodes are denoted by $n_1$, $n_2$ and $n_3$, and the three boundary point strings are denoted by $b_1$, $b_2$ and $b_3$ in a sequence from the one with the smallest curvature. The partial graph is obtained by recognizing from the curvature $k(b_1)$ and the curvature $k(b_2)$ whether the logical connection relationship representing the cell pattern is the Y-shape, the V-shape or the T-shape.

When curvature $k(b_1) > T_2$, where $T_2$ is a threshold value, the boundary point string which has the smallest curvature can be considered a concave and the branch is regarded as the Y-shape. There is no guarantee from the algebraic equation that the three straight lines intersect at one point. For this reason, the coordinate of the center of gravity of the furthermost points of the three boundary point strings is obtained, and a branch point node which has this coordinate is added. Three arcs which connect this branch point node and the three nodes $n_1$, $n_2$ and $n_3$ are formed.

When Y-shape does not hold and curvature $k(b_2) < T_3$, where $T_3$ is a threshold value, the boundary point string which has the second smallest curvature cannot be considered a concave and the branch is regarded as the V-shape. Two arcs which connect the node which connects to $b_1$ and $b_2$ and the other two nodes are formed.

Otherwise, that is, the branch is neither the Y-shape nor the V-shape. Hence, it can be regarded that the branch is the T-shape. First, a straight line $L_1$ which connects the two nodes connecting to $b_1$ is obtained. Then, a straight line $L_2$ which represents the state of the line segment which passes through the remaining node, say $n_0$ in a vicinity of the branch is obtained.

Figure 17:
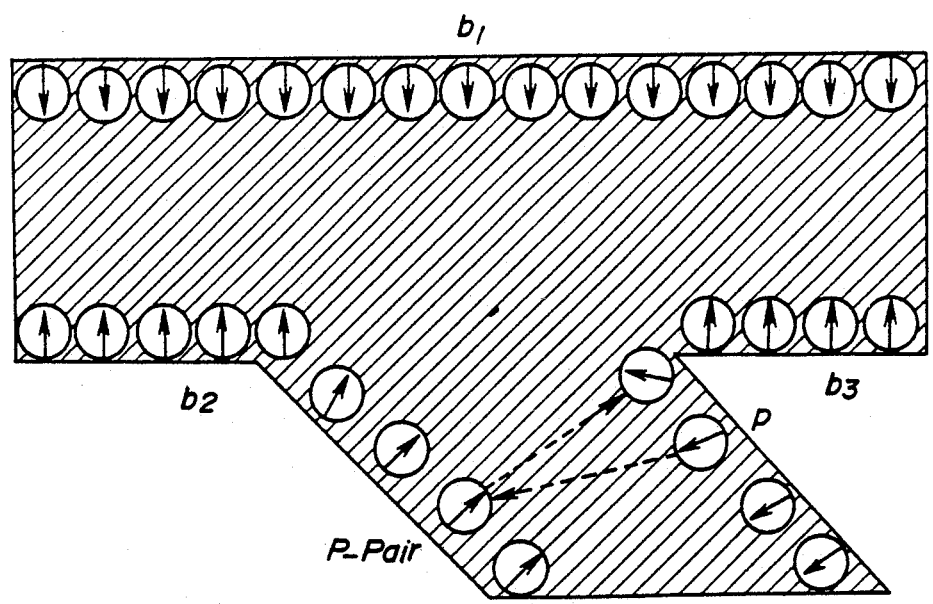
FIG. 17 is a diagram for explaining a linear equation in a vicinity of a branch.

FIG. 17 is a diagram for explaining the method of obtaining the straight line $L_2$. First, it is noted that the boundary point strings which connect to the node $n_0$ are $b_2$ and $b_3$. Then, out of the boundary points p such that the confronting boundary point p_pair belongs to the boundary point string $b_2$ and the confronting boundary point to the confronting boundary point p_pair belongs to the boundary point string $b_3$, the boundary point p which is furthermost from the node $n_0$ is obtained. A straight line which passes through the middle point between p and p_pair and has an inclination direction which divides the inclination direction of p and p_pair into two is obtained as the straight line $L_2$.

Finally, an intersection of the straight lines $L_1$ and $L_2$ is obtained, and a branch point node which has the coordinate of this intersection is added. Then, three arcs which represent the connections of the branch point node and the three nodes $n_1$, $n_2$ and $n_3$ are formed.

In a case where the number of nodes is four as shown in FIG. 15E, the step sb326 carries out the following process. That is, it is assumed that an X-shape intersection exists, and two straight lines which respectively pass through two nodes and intersect in the X-shape are obtained. The intersection of these two straight lines is obtained, and an intersection node which has the coordinate of this intersection is added. Then, four arcs which represent the connections of this intersection node and the four nodes are formed.

In a case where the number of nodes is five or more as shown in FIG. 15F, the step sb327 carries out the following process. It is extremely rare that such a cell appears. Hence, it is assumed that the recognition of the cell pattern is difficult or impossible, and the center of gravity of the coordinates of the furthermost points of all the boundary point strings is obtained. An indefinite point node which has the coordinate of this indefinite point node is added, and arcs which represent the connections of the indefinite point node and the five or more nodes are formed.

In each of the processes described above, the following measures are taken so as to avoid the formation of a short arc which would deteriorate the reliability of the direction.

A node which is added is denoted by $node_{new}$ and an existing node which has a coordinate closest to $node_{new}$ is denoted by $node_{old}$. When a distance between $node_{new}$ and $node_{old}$ is sufficiently small, the coordinate of $node_{new}$ is copied as that of $node_{old}$, and an arc related to $node_{new}$ is adjusted so as to connect to $node_{old}$.

In the partial graph forming process described above, no consideration is given as to the defaced or distorted portion of the original image. But when taking the defaced portion of the original image into consideration, the following process may be added. In other words, the defaced portion within the cell is detected from the relationship of the cell size, the number of meshes and the number of black pixels. When the defaced portion is detected, the cell pattern and the connection relationship is unchanged but a retrial is made with the threshold value changed so that the defaced portion is no longer detected. When the defaced portion is still detected, an attribute is added to indicate that the partial graph includes the defaced portion.

The basic step S4 comprises the step sb41 for making the cell features global. The cell features are made globaly for the following two reasons, namely, (i) to correct the graph which is obtained by the basic steps S1 through S3 and (ii) to form a high order graph which has a high degree of abstract.

The correction of the graph which is obtained by the basic steps S1 through S3 are required especially when the original image has a poor quality. There is no need to make the cell features global in the case of a printed output of a computer aided design (CAD) and a simple printed character, since the original image has a high quality in such cases. On the other hand, the quality of the original image is poor when the line drawing (characters, drawing or the like) is hand-written or a copy is obtained by repeated photocopying, and in such cases it is difficult even for man to make a recognition solely from the cell pattern. Hence, in such cases where the recognition is difficult, there is a need to withhold a judgement and correct the graph so that it is generally correct by using the features of the adjacent cells.

Figure 18:
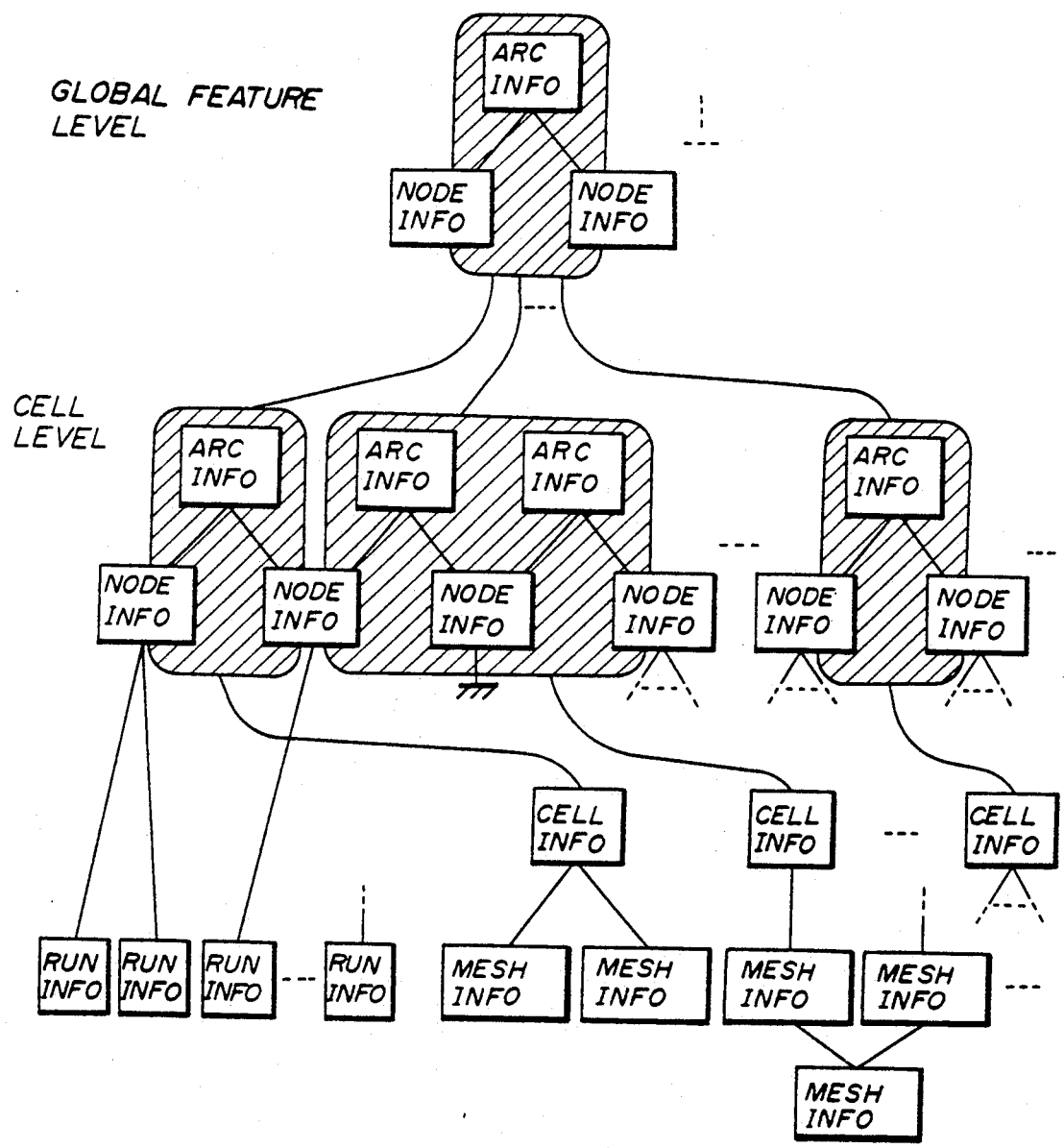
FIG. 18 is a diagram for explaining a hierarchical graph structure.

On the other hand, the formation of a high order graph is desired from the point of view of flexibility. By the generalization process, the data structure shown in FIGS. 4A through 4F can be represented by a hierarchical graph structure shown in FIG. 18 which has levels of graphs from the low order graph to the high order graph. FIGS. 19A through 19E show examples of the hierarchical graph structure. In other words, by generalizing the cell features, only an extremely rough shape is finally represented as shown in FIG. 19E. FIG. 19A shows a result of a mesh division, and FIG. 19B shows a result of a cell formation by integrating the meshes. FIGS. 19C, 19D and 19E respectively show first order, second order and third order graphs.

By utilizing the hierarchical graph to the line drawing recognition, it is possible to construct a highly efficient recognition system in which the recognition is made at a high speed in the high order level and a reference is made to the low order level or the cell level only when a more detailed information is required.

In FIG. 3, it is possible to omit the basic step S2 and carry out the processes of forming the partial graph and making the cell features global by regarding the mesh which has the mesh size obtained in the basic step S1 as the cell. Next, a description will be given of a second embodiment of the feature extracting method according to the present invention in which the basic step S2 is omitted in this manner.

In the second embodiment, the input line drawing image is equally divided into small cells (meshes), and local features are obtained for each cell unit from the pattern of black picture elements in the periphery of the cell. Thereafter, the state of adjacent cells surrounding the object cell is examined to correct the result of the local feature extraction process, and a final graph representation is obtained for the line drawing.

The nodes are generated according to the following rules. According to a first rule, when a link does not pass through a corner point of a cell, a node which has the coordinate of the middle point of this link is generated. According to a second rule, when a link passes through the corner point of the cell, black runs in the horizontal and vertical directions are obtained for each corner point, and a node which has the coordinate of the middle point of the shorter black run is generated.

FIGS. 20A through 20D are diagrams for explaining the node generation and the node connection in the second embodiment. In FIGS. 20A through 20D, a hatched portion indicates a line segment of the line drawing, and a black region indicates a link which has a width of one pixel.

Figure 20A:
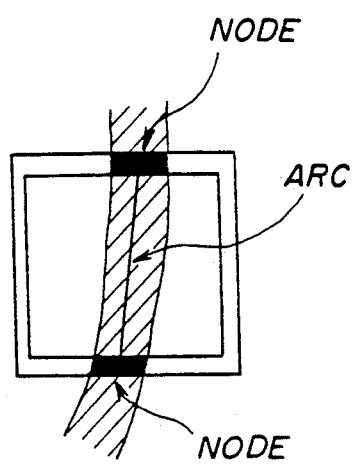
FIGS. 20A through 20D are diagrams for explaining a second embodiment of the feature extracting method according to the present invention.
Figure 20B:
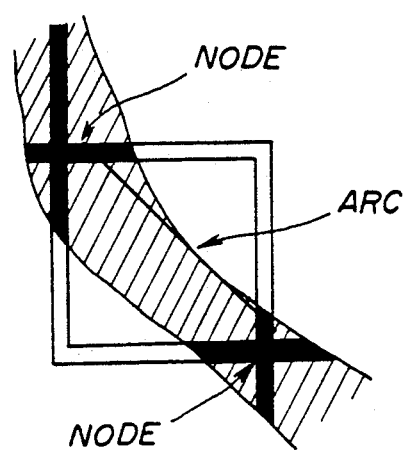
Figure 20C:
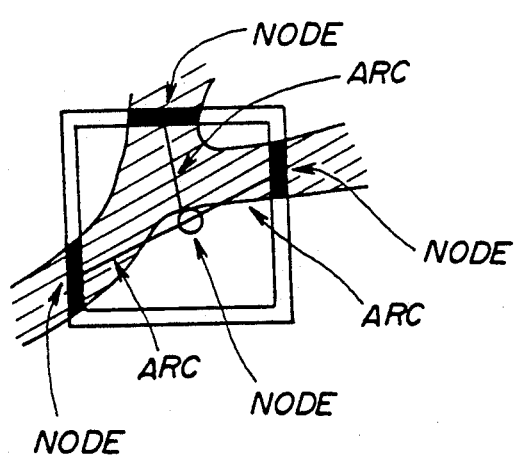
Figure 20D:
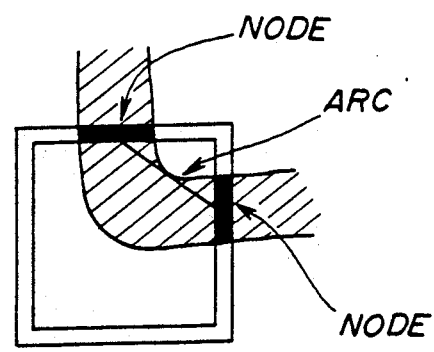

In FIGS. 20A, 20C and 20D, the link does not pass through the corner point of the cell. Hence, the node which has the coordinate of the middle point of the link is generated. In FIG. 20B, the link passes through the corner point of the cell, and the node which has the coordinate of the middle point of the shorter black run out of the black runs in the horizontal and vertical directions is generated for each corner point. As shown in FIGS. 20A, 20B and 20D, the connection of the node (generation of the arc) is made by connecting the nodes when the number of nodes within the cell is two. On the other hand, when the number of nodes and the number of links within the cell are both three or greater as shown in FIG. 20C, a node which represents a branch or an intersection is additionally generated as indicated by a circular mark, and this additionally generated node is connected to the other nodes. In the case of the branch node shown in FIG. 20C where the position cannot be limited, the general feature extraction process which is next carried out becomes effective.

In the general feature extraction process, the observation unit of the input line drawing is extended to $3 \times 3$ cells, for example, and the state of cells adjacent to the center object cell is also examined so as to correct the erroneous result and fuzzy result which are obtained from the local feature extraction process carried out with the cell unit.

Figure 21A:
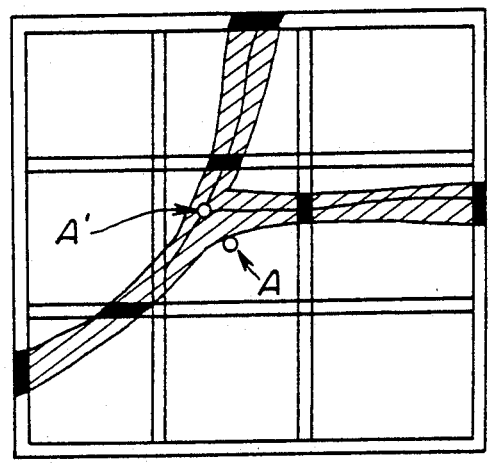
FIGS. 21A and 21B are diagrams for explaining a node correction in the second embodiment.
Figure 21B:
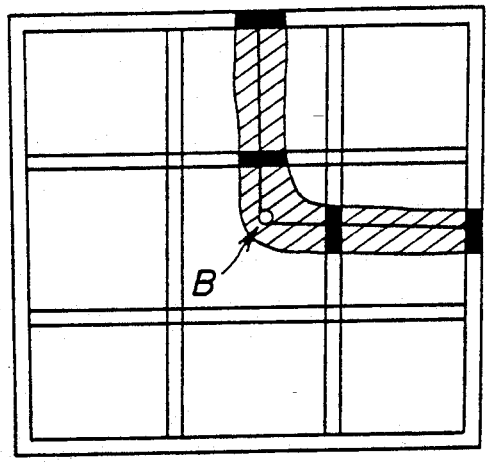

FIGS. 21A and 21B are diagrams for explaining a node correction in the second embodiment. FIG. 21A shows a case where the branch node is moved from A to A' with respect to the cell shown in FIG. 20C. On the other hand, FIG. 21B shows a case where a node B which represents a bent point is inserted with respect to the cell shown in FIG. 20D.

By the above described process, it is possible to obtain a graph representation of the input line drawing image data.

Further, the present invention is not limited to these embodiments, but various variations and modifications may be made without departing from the scope of the present invention.

What is claimed is:

1. A feature extraction method for converting image data of an input line drawing into a graph representation and for recognizing the input line drawing by use of the graph representation, said feature extracting method comprising:

a first step of equally dividing the image data of the input line drawing into meshes, each mesh being an observation unit;

a second step of forming a cell by joining one or more adjacent meshes, each cell being an observation unit and having only one black picture region connecting component; and a third step of recognizing a cell pattern for each cell obtained so as to form a graph in correspondence with each of the cells, the recognizing step including:

(1) obtaining a pattern of a link of black pixels on a cell boundary and local features within the cell;

wherein said first step divides the image data into meshes which overlap each other, said second step obtains the cell by integrating adjacent meshes which commonly own a black picture element at a corner point or commonly own a link which traverses no line segment, said link being a run which is observed on boundary pixels of the meshes or cells, and said third step recognizes the cell pattern by obtaining a pattern of a link of black pixels on a cell boundary and local features within the cell, obtains a partial graph of a first order graph depending on the recognized cell pattern and the local features, obtains a second order graph by correcting the local features using a combination or propagation of local features of cells adjacent to an object cell, combining the local features while tracing the first and second order graphs, and finally obtains a hierarchical graph representation of the line drawing by repeating a process of obtaining a graph representation with a higher degree of abstract.

2. The feature extracting method as claimed in claim 1 wherein said third step detects a defaced portion from relationships of a cell size, a number of meshes and a number of black pixels, makes a retrial of the cell pattern recognition with a reduced binarization the threshold value when the defaced portion is detected, adding to the partial graph an attribute which indicates a defaced portion when no curve is detected by the retrial, and correcting the partial graph of the first order graph by correcting the local features and the attribute using a combination or propagation of the attribute between adjacent cells which commonly own a link.

3. The feature extracting method as claimed in claim 1 wherein said third step adds a node to the partial graph of the first order graph when a line end is detected from a boundary point stirring within the cell, and a process which is carried out with respect to the partial graph is selected depending on a number of nodes.

4. The feature extracting method as claimed in claim 3 wherein said third step adds a node at a center of gravity of the boundary point strings when the number of nodes is zero, obtains a curvature of the boundary point string when the number of nodes is two and adds a connecting point node if necessary, adds a branch point node when the number of nodes is three by recognizing whether a logical connection relationship is a Y-shape, a V-shape or a T-shape from the curvature, adds an intersection node when the number of nodes is four, and adds an indefinite point node when the number of nodes is five or greater.

5. The feature extracting method as claimed in claim 4 wherein said third step obtains a straight line which represents a state of a line segment which has a node N in a vicinity of a branch when the number of nodes is three and a branch has a T-shape by obtaining a straight line which has an inclination direction which divides in two an inclination direction of boundary points p and $p_{13}$pair and passes through a middle point between the boundary points p and p_pair, said boundary point p being furthermost from the node N out of boundary points p belonging to a boundary point string B1 such that a confronting boundary point p_pair belongs to a boundary point string B2 and a boundary point confronting the confronting boundary point p_pair belongs to the boundary point string B1, where B1 and B2 denote the boundary point strings which connect to the node N, two nodes in the T-shape branch sharing a common boundary whose curvature is a minimum, said node N being other than said two nodes.

* * * * *